(12) United States Patent
Oh et al.

(10) Patent No.: US 10,907,243 B2
(45) Date of Patent: Feb. 2, 2021

(54) PLATED STEEL MATERIAL HAVING EXCELLENT FRICTION RESISTANCE AND WHITE RUST RESISTANCE AND METHOD FOR PREPARING SAME

(71) Applicant: POSCO, Pohang-si (KR)

(72) Inventors: Min-Suk Oh, Gwangyang-si (KR); Jong-Sang Kim, Gwangyang-si (KR); Il-Ryoung Sohn, Gwangyang-si (KR); Tae-Chul Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 239 days.

(21) Appl. No.: 16/064,768

(22) PCT Filed: Dec. 16, 2016

(86) PCT No.: PCT/KR2016/014820
§ 371 (c)(1),
(2) Date: Jun. 21, 2018

(87) PCT Pub. No.: WO2017/111400
PCT Pub. Date: Jun. 29, 2017

(65) Prior Publication Data
US 2019/0010595 A1    Jan. 10, 2019

(30) Foreign Application Priority Data
Dec. 24, 2015    (KR) .................. 10-2015-0186574

(51) Int. Cl.
*C23C 2/06* (2006.01)
*C23C 2/40* (2006.01)
(Continued)

(52) U.S. Cl.
CPC ............. *C23C 2/06* (2013.01); *B32B 15/013* (2013.01); *C22C 18/04* (2013.01); *C23C 2/04* (2013.01);
(Continued)

(58) Field of Classification Search
None
See application file for complete search history.

(56) References Cited

U.S. PATENT DOCUMENTS
3,505,043 A    4/1970   Lee et al.
6,635,359 B1  10/2003  Kurosaki et al.
(Continued)

FOREIGN PATENT DOCUMENTS
CN    1369020    9/2002
CN    1708600   12/2005
(Continued)

OTHER PUBLICATIONS

Chinese Office Action—Chinese Application No. 201680075903.3 dated Sep. 4, 2019, citing CN1503853, CN1369020, CN104561874, CN1708600, CN103282533, CN103572189, KR101376381, KR20150075650, CN102449182 and Lebozec.
(Continued)

*Primary Examiner* — Daniel J. Schleis
(74) *Attorney, Agent, or Firm* — Cantor Colburn LLP

(57) ABSTRACT

A plated steel material includes a plated layer containing, by wt %: 0.5 to 14% of Al, 0.5 to 5% of Mg, and the balance being Zn and inevitable impurities. The plated steel material satisfies the following Equation: $([Mg]_S-[Mg]_{1/2})/[Mg]_{1/2} \geq 0.3$. $[Mg]_S$ means a content (wt %) of Mg in a surface of the plated layer, and $[Mg]_{1/2}$ means a content (wt %) of Mg at a ½t position (t represents a thickness of the plated layer) from the surface of the plated layer in a thickness direction.

12 Claims, 2 Drawing Sheets

(51) Int. Cl.
  *C23C 2/20* (2006.01)
  *C23C 2/04* (2006.01)
  *C23C 2/12* (2006.01)
  *C23C 2/26* (2006.01)
  *B32B 15/01* (2006.01)
  *C22C 18/04* (2006.01)
  *C23C 2/28* (2006.01)

(52) U.S. Cl.
  CPC ............... *C23C 2/12* (2013.01); *C23C 2/20* (2013.01); *C23C 2/26* (2013.01); *C23C 2/28* (2013.01); *C23C 2/40* (2013.01); *Y10T 428/12757* (2015.01)

(56) References Cited

U.S. PATENT DOCUMENTS

| | | | |
|---|---|---|---|
| 9,302,449 B2 * | 4/2016 | Kim | ............ C23C 2/06 |
| 2009/0297881 A1 | 12/2009 | Maalman et al. | |
| 2010/0024925 A1 | 2/2010 | Warnecke et al. | |
| 2010/0055344 A1 | 3/2010 | Ostwald et al. | |
| 2010/0086806 A1 | 4/2010 | Koumura et al. | |
| 2010/0139816 A1 | 6/2010 | Hanlon et al. | |
| 2012/0135261 A1 | 5/2012 | Smith et al. | |
| 2013/0183541 A1 | 7/2013 | Kim et al. | |
| 2014/0037856 A1 | 2/2014 | Moon et al. | |
| 2015/0225831 A1 | 8/2015 | Riener et al. | |

FOREIGN PATENT DOCUMENTS

| | | |
|---|---|---|
| CN | 102449182 | 5/2012 |
| CN | 103572189 | 2/2014 |
| EP | 1524326 | 4/2005 |
| EP | 2088219 | 8/2009 |
| IN | 653CHENP2014 | 10/2014 |
| JP | 51094429 | 8/1976 |
| JP | 58177446 | 10/1983 |
| JP | 60125360 | 7/1985 |
| JP | 02015152 | 1/1990 |
| JP | 10226865 | 8/1998 |
| JP | 11140615 | 5/1999 |
| JP | 11172401 | 6/1999 |
| JP | 11279733 | 10/1999 |
| JP | 2000104154 | 4/2000 |
| JP | 2002035861 | 2/2002 |
| JP | 2002285311 | 10/2002 |
| JP | 2002309360 | 10/2002 |
| JP | 2002332555 | 11/2002 |
| JP | 2004323974 | 11/2004 |
| JP | 2004339530 | 12/2004 |
| JP | 2005320556 | 11/2005 |
| JP | 2006193024 | 7/2006 |
| JP | 2009537697 | 10/2009 |
| JP | 2009537698 | 10/2009 |
| JP | 2010275634 | 12/2010 |
| KR | 20070029267 | 3/2007 |
| KR | 20090063216 | 6/2009 |
| KR | 20090122346 | 11/2009 |
| KR | 20120041619 | 5/2012 |
| KR | 20120075235 | 7/2012 |
| KR | 101376381 | 3/2014 |
| KR | 20140043471 | 4/2014 |
| KR | 20150075650 | 7/2015 |
| WO | 2006002843 | 1/2006 |

OTHER PUBLICATIONS

Japanese Office Action—Japanese Application No. 2018-532621 dated Aug. 6, 2019, citing JP 2014-501334, JP 2008-138285, JP 02-015152, JP 2004-323974, JP 2004-339530, JP 2005-320556, JP 2009-537697, JP 2009-537698, JP 58-177446, JP 10-226865, JP 11-172401, JP 60-125360, JP 2002-285311, JP 2006-193024, JP 2002-035861, JP 51-094429, JP 2002-309360, US 2015/0225831 and EP 01524326.

European Search Report—European Application No. 16879267.9, dated Aug. 28, 2018, citing LeBozec, et al., and EP 2 088 219.

LeBozec, et al., Effect of carbon dioxide on the atmospheric corrosion of Zn—Mg—Al coated steel, Corrosion Science, 2013, pp. 379-386.

European Search Report—European Application No. 16879267.9, dated Jan. 30, 2019, citing LeBozec, et al., EP 2 088 219, EP 1 524 326 and KR 2012-0075235.

* cited by examiner

FIG. 2A
FIG. 2B
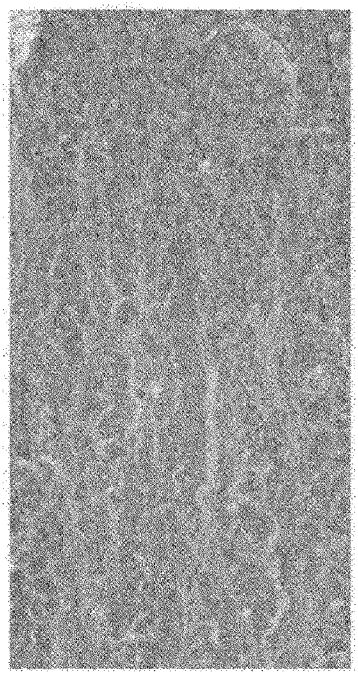
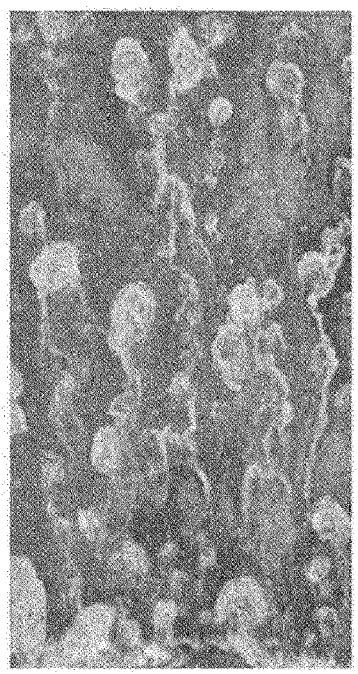

US 10,907,243 B2

PLATED STEEL MATERIAL HAVING EXCELLENT FRICTION RESISTANCE AND WHITE RUST RESISTANCE AND METHOD FOR PREPARING SAME

TECHNICAL FIELD

The present disclosure relates to a plated steel material having excellent friction resistance and white rust resistance and a method for preparing the same.

BACKGROUND ART

A zinc plating method suppressing corrosion of iron through cathodic protection has been widely used to prepare a steel material having high corrosion resistance due to excellent corrosion protection performance and economical efficiency. Particularly, demand for a hot-dip zinc-plated steel material obtained by dipping a steel material in molten zinc to form a plating layer has increased throughout various industries for applications such as vehicles, electric home appliances, building materials, and the like, due to a simple preparation process and a cheap product price, as compared to an electrically zinc-plated steel material.

The hot-dip zinc-plated steel material has sacrificial corrosion protection properties when exposed to a corrosive environment, as zinc, having a lower oxidation-reduction potential than that of iron, corrodes earlier than iron to suppress corrosion of the steel material, and zinc in a plated layer forms a dense corrosion product on a surface of the steel material while being oxidized, to block the steel material from an oxidizing atmosphere, thereby improving corrosion resistance of the steel material.

However, the necessity for developing a steel material having a better corrosion resistance than that of a zinc-plated steel material according to the related art has increased due to an increase in air pollution and worsening of corrosive environments in accordance with industrial upgrades and stricter regulations on resources and energy conservation.

In this regard, research into a technology of preparing a zinc alloy-based plated steel material capable of improving corrosion resistance of the steel material by adding elements such as aluminum (Al) and magnesium (Mg) to a zinc plating bath have been variously conducted. Research into a technology for preparing a Zn—Al—Mg based plated steel material in which Mg is additionally added to a Zn—Al plating composition as a zinc alloy based plating material has been actively conducted.

DISCLOSURE

Technical Problem

An aspect of the present disclosure is to provide a plated steel material having excellent friction resistance and white rust resistance, and a method for preparing the same.

Technical Solution

According to an aspect of the present disclosure, a plated steel material includes a plated layer containing, by wt %: 0.5 to 14% of Al, 0.5 to 5% of Mg, and a balance of Zn and inevitable impurities, wherein the plated steel material satisfies the following Equation 1:

$$([Mg]_S - [Mg]_{1/2}) / [Mg]_{1/2} \geq 0.3 \quad \text{[Equation 1]}$$

(here, $[Mg]_S$ is a content (wt %) of Mg in a surface of the plated layer, and $[Mg]_{1/2}$ is a content (wt %) of Mg at a ½t position (t represents a thickness of the plated layer, hereinafter the same) from the surface of the plated layer in a thickness direction).

According to another aspect of the present disclosure, a plated steel material includes a plated layer containing, by wt %: 0.5 to 14% of Al, 0.5 to 5% of Mg, and a balance of Zn and inevitable impurities, wherein a ratio ($C_L/C_0$) of a content $C_1$ (wt %) of Mg contained in a region from a surface of the plated layer to a ⅕t position in a thickness direction to an average content $C_0$ (wt %) of Mg contained in the plated layer is 1.02 or more.

According to another aspect of the present disclosure, a method for preparing a plated steel material includes: preparing a plating bath containing, by wt %, 0.5 to 14% of Al, 0.5 to 5% of Mg, and a balance of Zn and inevitable impurities; dipping base steel in the plating bath to perform plating thereon to obtain a plated steel material; adjusting a plating weight of the plated steel material; and injecting droplets of a magnesium-based phosphate aqueous solution onto the plated steel material of which the plating weight is adjusted to cool the plated steel material.

According to another aspect of the present disclosure, a method for preparing a plated steel material includes: preparing a plating bath containing, by wt %, 0.5 to 14% of Al, 0.5 to 5% of Mg, and a balance of Zn and inevitable impurities; dipping base steel in the plating bath to perform plating thereon to obtain a plated steel material; adjusting a plating weight of the plated steel material; primarily cooling the plated steel material of which the plating weight is adjusted to a primary cooling termination temperature of more than 380° C. to 420° C. or less at a primary cooling rate of 5° C./sec or less (excluding 0° C./sec); isothermally maintaining the primarily cooled plated steel material for 1 second or more at the primary cooling termination temperature; and secondarily cooling the isothermally maintained plated steel material to a secondary cooling termination temperature of 320° C. or less at a secondary cooling rate of 10° C./sec or more.

Advantageous Effects

As set forth above, according to an exemplary embodiment in the present disclosure, a plated steel material may have advantages such as excellent friction resistance and white rust resistance.

However, various advantages and effects of the present disclosure are not limited to the above-mentioned contents, but may be easily understood through descriptions of specific embodiments in the present disclosure.

DESCRIPTION OF DRAWINGS

FIGS. 2A and 2B are photographs of surfaces of plated steel materials after evaluating white rust resistance.

BEST MODE FOR INVENTION

Figure 1A:
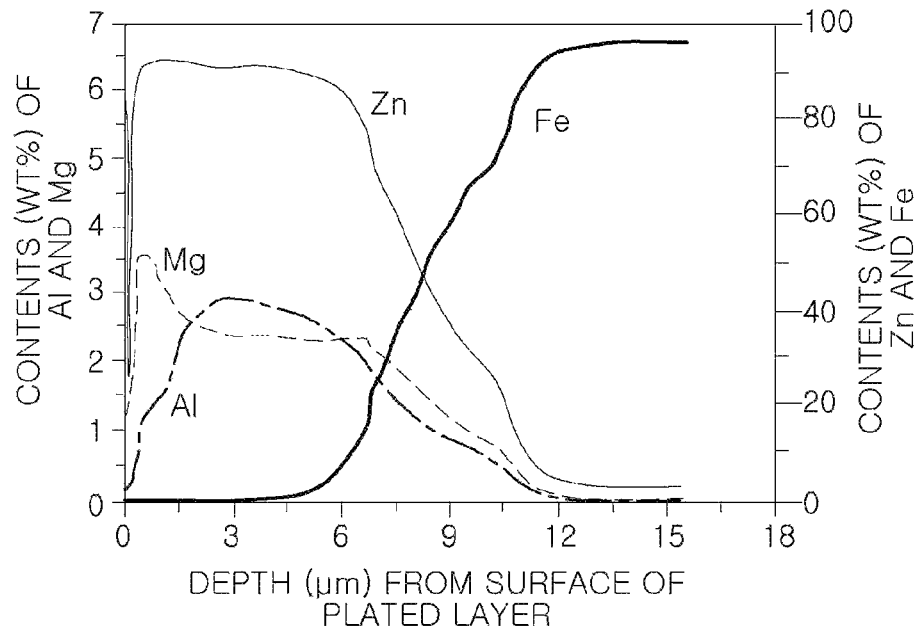
FIGS. 1A and 1B illustrate results obtained by measuring changes in contents of Al, Mg, Zn, and Fe depending on a depth of a plated layer of a plated steel material using glow discharge emission spectrometry (GDS).

Hereinafter, a plated steel material according to an aspect of the present disclosure will be described in detail.

The plated steel material according to the present disclosure may sequentially include base steel and a plated layer from an internal portion thereof. Here, the base steel may be base steel or wire rod, and in the present disclosure, a composition, a microstructure, and the like, of the base steel are not particularly limited. Further, the plated layer is formed on a surface of the base steel to prevent corrosion of the base steel under a corrosive environment.

The plated layer may contain, by wt %, 0.5 to 14% of Al, 0.5 to 5% of Mg and a balance of Zinc and inevitable impurities.

Mg is an element playing a significantly important role in improving corrosion resistance of the plated steel material by reacting with Zn and Al in the plated layer to form a Zn—Al—Mg based intermetallic compound. When a content of Mg is excessively low, a sufficient amount of Zn—Al—Mg based intermetallic compound may not be secured in a microstructure of the plated layer, such that an effect of improving corrosion resistance may not be sufficient. Therefore, Mg may be contained in the plated layer in a content of 0.5 wt % or more, preferably 1 wt % or more. However, when the content of Mg is excessively high, the effect of improving corrosion resistance may be saturated, and Mg-oxide dross may be formed in a plating bath, such that coatability may be deteriorated. Further, the Zn—Al—Mg based intermetallic compound having high hardness may be excessively formed in the microstructure of the plated layer, such that bending-workability may be deteriorated. Therefore, Mg may be contained in the plated layer in a content of 5 wt % or less, preferably 3 wt % or less.

Al is an element playing a significantly important role in improving corrosion resistance of the steel material by reacting with Zn and Mg in the plated layer to form the Zn—Al—Mg based intermetallic compound while suppressing formation of the Mg oxide dross. When a content of Al is excessively low, an effect of suppressing formation of the Mg oxide dross may be insufficient, and a sufficient amount of a Zn—Al—Mg based intermetallic compound may not be secured in the microstructure of the plated layer, such that an effect of improving corrosion resistance may not be sufficient. Therefore, Al may be contained in the plated layer in a content of 0.5 wt % or more, preferably 1 wt % or more. However, when the content of Al is excessively high, the effect of improving corrosion resistance may be saturated, and a temperature of the plating bath may be increased, which may have a negative influence on durability of a plating apparatus. Further, the Zn—Al—Mg based intermetallic compound having high hardness may be excessively formed in the microstructure of the plated layer, such that bending-workability may be deteriorated. Therefore, Al may be contained in the plated layer in a content of 14 wt % or less, preferably 11 wt % or less.

The present inventors have conducted extensive research in order to significantly increase friction resistance and white rust resistance of a plated steel material, and as a result, the present inventors found that friction resistance and white rust resistance of the plated steel material may be improved by concentrating Mg contained in the plated layer in the vicinity of a surface of the plated layer. The reason is that the larger the surface concentration rate of Mg in the plated layer, the larger the surface hardness of the plated layer, such that friction resistance of the plated steel material is improved, and a large amount of stable Mg-based corrosion products are formed on a surface layer portion of the plated layer in an initial stage of corrosion, such that white rust resistance of the plated steel material is improved.

In the plated steel material according to the present disclosure, a concentration of Mg in the plated layer may satisfy the following Equation 1. Meanwhile, $([Mg]_S-[Mg]_{1/2})/[Mg]_{1/2}$ may be more preferably 0.4 or more and more preferably 0.6 or more.

$$([Mg]_S-[Mg]_{1/2})/[Mg]_{1/2} \geq 0.3 \quad \text{[Equation 1]}$$

In Equation 1, $[Mg]_S$ is a content (wt %) of Mg in the surface of the plated layer, and $[Mg]_{1/2}$ is a content (wt %) of Mg at a ½t position (t represents a thickness of the plated layer, hereinafter the same) from the surface of the plated layer in a thickness direction.

Meanwhile, a specific method for measuring $[Mg]_S$ and $[Mg]_{1/2}$ is not particularly limited in the present disclosure, but, for example, the following method may be used. That is, after vertically cutting the plated steel material and measuring content distributions of Mg, Zn, and Fe in a cross section of the plated layer using glow discharge emission spectrometry (GDS), a maximum value of the content (wt %) of Mg in a region within 0.5 μm from the surface of the plated layer in the thickness direction may be defined as $[M]_S$, and a content (wt %) of Mg in a central point of a position at which the contents of Zn and Fe are equal to each other from the surface of the plated layer may be defined as $[M]_{1/2}$. Here, the reason to define $[M]_S$ as the maximum value of the content (wt %) of Mg in the region within 0.5 μm from the surface of the plated layer in the thickness direction rather than to simply define $[M]_S$ as the content of Mg in the surface of the plated layer is that a fine oxide film may be formed on the surface of the plated layer before GDS analysis, and other foreign materials may be adsorbed, and thus, GDS data regarding an extreme surface layer of the plated layer may be data regarding other foreign materials, or the like, rather than data regarding the plated layer itself.

In the plated steel material according to the present disclosure, a ratio of a content $C_1$ (wt %) of Mg contained in a region from the surface of the plated layer to a ⅕t position in the thickness direction to an average content $C_0$ (wt %) of Mg contained in the plated layer may be 1.02 or more, preferably 1.04 or more, and more preferably 1.10 or more.

Meanwhile, a specific method for measuring $C_0$ and $C_1$ is not particularly limited in the present disclosure, but, for example, the following method may be used. That is, after vertically cutting the plated steel material, taking a cross sectional image thereof at magnification of 3,000× using a field emission-scanning electron microscope (FE-SEM), and point-analyzing contents of Mg at 28 points at an equidistance from the surface of the plated layer to an interface using energy dispersive spectroscopy (EDS), an average value of the contents of Mg measured at 3 points in the vicinity of the surface of the plated layer may be defined as $C_1$, and an average value of the contents of Mg measured at all the 28 points including the 3 points in the vicinity of the surface of the plated layer may be defined as $C_0$.

Since there are various methods for adjusting the above-mentioned distribution of Mg, the method is not particularly limited in the independent claims of the present disclosure. However, as an example, the above-mentioned position distribution may be obtained by injecting droplets of magnesium-based phosphate aqueous solution to cool the plated layer at the time of cooling the plated layer in a molten state as described below.

The plated layer may contain a Zn single phase structure as the microstructure and the Zn—Al—Mg based intermetallic compound. In the present disclosure, the kind of Zn—Al—Mg-based intermetallic compound is not particularly limited, but may be, for example, one or more selected from the group consisting of a Zn/Al/MgZn$_2$ ternary eutectic structure, a Zn/MgZn$_2$ binary eutectic structure, a Zn—Al binary eutectic structure, and an MgZn$_2$ single phase structure. However, the Zn—Al—Mg based intermetallic compound is not necessarily limited thereto.

According to an exemplary embodiment, the Zn single phase structure may contain Mg in a content of 0.03 wt % or less (including 0 wt %).

Since in a state diagram, a solid-solubility limit of Mg with respect to Zn is 0.05 wt %, Mg may be contained in a content up to 0.05 wt % in the Zn single phase structure. However, when Mg is contained in the Zn single phase structure as described above, which is disadvantageous for concentrating Mg in the surface of the plated layer, a melting point of the Zn single phase structure may be decreased, thereby causing liquid metal embrittlement (LME) cracks. Therefore, in the present disclosure, the content of Mg solid-dissolved in the Zn single phase structure is suppressed as much as possible. An upper limit of the content of Mg contained in the Zn single phase structure in order to achieve the desired effect in the present disclosure may be 0.03 wt %, more preferably 0.01 wt %.

Since there are various methods for adjusting the content of Mg solid-dissolved in the Zn single phase structure described above, in the present disclosure, the method is not particularly limited. However, as an example, the above-mentioned content of Mg may be obtained by suitably controlling an inlet temperature of the base steel in the plating bath and the temperature of the plating bath or injecting droplets of magnesium-based phosphate aqueous solution to cool the plated layer at the time of cooling the plated layer in a molten state as described below.

As described above, the plated steel material according to the present disclosure may be prepared by various methods, and a method for preparing the same is not particularly limited. However, as an exemplary embodiment, the plated steel material may be prepared by the following method.

First, after preparing a plating bath containing, by wt %, 0.5 to 14% of Al, 0.5 to 5% of Mg, and a balance of Zn and inevitable impurities, a plated steel material may be obtained by dipping base steel in the plating bath and performing plating thereon.

According to the exemplary embodiment, a temperature of the plating bath may be preferably 440 to 460° C., and more preferably 445 o 455° C.

According to the exemplary embodiment, when the temperature of the plating bath is defined as $T_1$ (° C.), and a surface temperature of the base steel introduced into the plating bath is defined as $T_2$ (° C.), a ratio ($T_2/T_1$) of $T_2$ to $T_1$ may be controlled to be preferably 1.10 or less, more preferably 1.08 or less, and furthermore preferably to 1.05 or less. Here, a surface temperature of a base steel sheet introduced into the plating bath may mean a surface temperature of the base steel sheet immediately before or immediately after being dipped in the plating bath. In a case of controlling the ratio ($T_2/T_1$) of $T_2$ to $T_1$ to be low as described above, the Zn single phase may be mainly solidified in an interface between the plated layer and the base steel, and thus, surface concentration of Mg may be further promoted.

Next, a plating weight may be adjusted by performing gas-wiping treatment on the plated steel material. In order to smoothly adjust a cooling rate and prevent surface oxidation of the plated layer, nitrogen (N$_2$) gas or argon (Ar) gas may be preferably used as a wiping gas.

Then, the plated steel material of which the plating weight is adjusted may be cooled. Here, the plated steel material may be cooled by any one of the following two methods.

(1) Cooling by Injecting Droplet of Magnesium-Based Phosphate Aqueous Solution

The plated steel material of which the plating weight is adjusted may be cooled by injecting droplets of magnesium-based phosphate aqueous solution thereon. The plated steel material is cooled by injecting droplets of the magnesium-based phosphate aqueous solution, which is advantageous for improving the surface concentration rate of magnesium in the plated layer, and the plated layer in the molten state may be rapidly cooled by an endothermic reaction, which is advantageous for decreasing the content of Mg solid-dissolved in the Zn single phase structure. Here, the magnesium-based phosphate aqueous solution may be, for example, Mg$_3$(PO$_4$)$_2$.

According to the exemplary embodiment, at the time of injecting the droplets, a droplet spraying initiation temperature may be 405 to 425° C., more preferably 410 to 420° C. Here, the droplet spraying initiation temperature is a surface temperature of the plated steel material at a point in time at which droplet spraying is initiated. When the droplet spraying initiation temperature is less than 405° C., solidification of the Zn single phase structure may be already initiated, such that surface concentration of Mg may not be effectively performed, and when the droplet spraying initiation temperature is more than 425° C., the endothermic reaction by droplet spraying may not be effective, such that it may be difficult to secure a structure to be desired.

According to the exemplary embodiment, droplet spraying may be charge-spraying so that magnesium based phosphate droplets are attached to the plated steel material by electrostatic attractive force with the plated steel material. The charge spraying as described above may help in finely and uniformly forming droplets and decrease an amount of droplets bounced after the injected droplets collides with the surface of the plated steel material, which is advantageous for rapidly cooling the plated layer in the molten state. Therefore, charge spraying is more effective in securing the surface concentration rate of magnesium in the plated layer.

According to the exemplary embodiment, at the time of injecting the droplet, an spraying amount of the droplets may be 50 to 100 g/m$^2$. When the spraying amount is less than 50 g/m$^2$, the effect may be insufficient, and when the spraying amount is more than 100 g/m$^2$, the effect may be saturated, which is not preferable.

According to the exemplary embodiment, a concentration of the magnesium-based phosphate aqueous solution may be 1 to 3 wt %. When the concentration of the phosphate aqueous solution is less than 1 wt %, the effect may not be sufficient, and when the concentration of the phosphate aqueous solution is more than 3 wt %, the effect may be saturated, and a nozzle clogging phenomenon may occur in a case of continuous production to result in hindering production.

(2) Multi-Stage (Two-Stage) Cooling

The plated steel material of which the plating weight is adjusted may be primarily cooled. The present stage is performed in order to induce solidification of Zn in the vicinity of an interface between the base steel and the plated layer.

At the time of primary cooling, a cooling rate may be preferably 5° C./sec or less (excluding 0° C./sec), more preferably 4° C./sec or less (excluding 0° C./sec), and further more preferably 3° C./sec or less (excluding 0° C./sec). When the cooling rate is more than 5° C./sec, solidification of Zn is initiated from the surface of the plated layer of which a temperature is relatively low, such that it may be difficult to secure a surface concentration rate of Mg to be desired. Meanwhile, since the smaller the cooling rate, the more advantageous for securing the surface concentration rate of Mg, a lower limit of the cooling rate at the time of primary cooling is not particularly limited.

Further, at the time of primary cooling, a cooling termination temperature is preferably more than 380° C. to 420° C. or less, more preferably 390° C. or more to 415° C. or less, and further more preferably 395° C. or more to 405° C. or less. When the cooling termination temperature is 380° C. or less, the content of Mg solid-dissolved in the Zn single phase structure may be increased, or a large amount of Zn—Al—Mg based intermetallic compound is formed in the vicinity of the interface between the base steel and the plated layer, such that it may be difficult to secure a surface concentration rate of Mg to be desired. On the contrary, when the cooling termination temperature is more than 420° C., Zn may not be sufficiently solidified.

Thereafter, the primarily cooled plated steel material may be isothermally maintained at a primary cooling termination temperature.

At the time of isothermally maintaining the plated steel material, a holding time may be preferably 1 second or more, more preferably 5 seconds or more and further more preferably 10 seconds or more. This it to induce partial solidification of only Zn while maintaining an alloy phase having a low solidification temperature in a liquid phase. Meanwhile, since the longer the isothermal holding time, the more advantageous for securing the surface concentration rate of Mg to be desired, an upper limit of the isothermal holding time is not particularly limited.

Then, the isothermally maintained plated steel material may be secondarily cooled. The present stage is to sufficiently secure the surface concentration rate of Mg by solidifying a plated layer remaining in a liquid phase.

At the time of secondary cooling, a cooling rate may be preferably 10° C./sec or more, more preferably 15° C./sec or more, and furthermore preferably 20° C./sec more. As described above, solidification of the remaining liquid phase in a surface portion of the plated layer having a relatively low temperature may be induced by performing rapid cooling at the time of secondary cooling, and thus, the surface concentration rate of Mg may be sufficiently secured. When the cooling rate is less than 10° C./sec, it may be difficult to secure a surface concentration rate of Mg to be desired, and the plating layer may be attached to an upper roll of a plating apparatus, or the like, to thereby be delaminated. Meanwhile, since the larger the cooling rate, the more advantageous for securing the surface concentration rate of Mg, an upper limit of the cooling rate at the time of secondary cooling is not particularly limited.

Further, at the secondary cooling, a cooling termination temperature may be preferably 320° C. or less, more preferably 300° C. or less, and further more preferably 280° C. or less. When the cooling termination temperature is within the above-mentioned range, the plated layer may be completely solidified, and a change in temperature of the steel sheet after the secondary cooling that does not have an influence on the surface concentration rate of Mg, the temperature of the steel sheet after the secondary cooling is not particularly limited.

MODE FOR INVENTION

Hereinafter, the present disclosure will be described in more detail through Inventive Examples. However, these Inventive Examples are provided only for illustrative purposes, and the present disclosure is not limited thereto. The scope of the present disclosure is determined by the contents disclosed in the following claims and contents reasonably inferred therefrom.

As a test sample for plating, a low-carbon cold-rolled steel sheet having a thickness of 0.8 mm, a width of 100 mm, and a length of 200 mm was prepared as a base steel sheet, and the base steel sheet was dipped in acetone and subjected to ultrasonic cleaning, thereby removing foreign materials such as rolling oil, and the like, existing on a surface of the steel sheet. Thereafter, after performing heat treatment at 750° C. under a reduction atmosphere, for securing mechanical properties of a steel sheet in a general hot dipping field, the steel sheet was dipped in a zinc based plating bath (a temperature of the plating bath: 450° C.) containing 2.5 wt % of Al and 3 wt % of Mg, thereby preparing a plated steel material.

Here, a surface temperature of base steel introduced into the plating bath was constantly 470° C. Then, each of the prepared plated steel materials was subjected to gas wiping to adjust a plating weight to 70 g/m$^2$ per one side, and cooling was performed under the conditions illustrated in the following Table 1.

Thereafter, each of the plated steel materials was vertically cut, and distribution of Mg in a plated layer was analyzed through GDS and EDS analysis. The results are illustrated together in the following Table 1. A specific measurement method is as described above.

Then, friction resistance, white rust resistance, and spot-weldability of each of the plated steel materials were evaluated, and the results are illustrated in the following Table 2.

Friction resistance was evaluated by the following method.

For a linear friction test, friction was applied a total of 20 times in a state in which a predetermined pressure was applied to a surface of each of the prepared plated steel materials using a tool head. Here, a target load was 333.3 kgf, the pressure was 3.736 MPa, a movement distance of the tool head per one time friction was 200 mm, and a movement speed of the tool head was 20 mm/s.

After friction, a peel test was performed on each of the plated steel materials. More specifically, after closely adhering a cellophane adhesive tape (NB-1, manufactured by Ichiban) to a bent portion of each of plated steel wires bent at a bend radius of 10R, the cellophane adhesive tape was instantly peeled off, and the number of defects of the plated layer was measured using an optical microscope (magnification: 50×). As a measurement result, a case in which the number of defects of the plated layer was 5/m$^2$ or less was evaluated as "⊙", a case in which the number of defects of the plated layer was 10/m$^2$ or less was evaluated as "○", and a case in which the number of defects of the plated layer was more than 10/m$^2$ was evaluated as "X". The results are illustrated together in the following Table 2.

White rust resistance was evaluated by the following method.

Each of the plated steel materials was charged in a salt water spray tester, and a time passed until a red rust occurred was measured according to International Standard (ASTM B1117-11). Here, 5% salt water (temperature: 35, and pH 6.8) was used, and 2 ml/80 cm$^2$ of salt water was sprayed per hour. A case in which an area of a white rust formed after 72 hours analyzed using an image analyzer was 5% or less was evaluated by ""⊙", a case in which the area was 10% or less was evaluated as "○", and a case in which the area was more than 10% was evaluated as "X".

Spot-weldability was evaluated by the following method.

Welding was continuously performed under the conditions at which welding force was 2.1 Kn, a resistance welding time was 11 cycles (here, 1 cycle=1/60 seconds, hereinafter the same) and a holding time was 11 cycles while flowing a welding current of 7 kA using a Cu—Cr electrode having a tip diameter of 6 mm. When a thickness of a steel sheet was t, the number of welding spots immediately before a welding spot at which a diameter of a nugget was smaller than 4 √t was set as the number of consecutive welding spots. Here, the larger the number of consecutive welding spots, the more excellent the spot weldability. A case in which the number of consecutive welding spots was 700 spots or more was evaluated as "⊙", a case in which the number of consecutive welding spots was 500 spots or more was evaluated as "○", and a case in which the number of consecutive welding spots was less than 500 spots was evaluated as "X".

TABLE 1

| Reference | Cooling Method | Content (wt %) and Distribution of Mg | | | | | |
|---|---|---|---|---|---|---|---|
| | | $[Mg]_s$ | $[Mg]_{1/2}$ | $([Mg]_s - [Mg]_{1/2})/[Mg]_{1/2}$ | $C_0$ | $C_1$ | $C_1/C_0$ |
| Inventive Example 1 | Charge Spraying of $Mg_3(PO_4)_2$ Aqueous Solution (2 wt %) Spraying Initiation Temperature: 415° C. Spraying Amount: 80 g/m² | 3.74 | 2.31 | 0.61 | 3.18 | 2.74 | 1.16 |
| Inventive Example 2 | Primary Air-cooling to 400° C. At Average Cooling Rate of 2° C./s Isothermal Holding at 400° C. for 10 sec Secondary Air-Cooling to 280° C. at Average Cooling Rate of 20° C./s | 3.55 | 2.71 | 0.31 | 3.09 | 2.97 | 1.04 |
| Comparative Example 1 | Air-cooling to 280° C. at average Cooling Rate of 12° C./s | 2.54 | 2.42 | 0.04 | 3.04 | 3.00 | 1.01 |

TABLE 2

| Reference | Friction Resistance | White Rust Resistance | Spot Weldability |
|---|---|---|---|
| Inventive Example 1 | ⊙ | ⊙ | ⊙ |
| Inventive Example 2 | ○ | ○ | ○ |
| Comparative Example 1 | X | X | X |

Referring to Tables 1 and 2, in Inventive Examples 1 and 2, distribution of Mg in the plated layer was suitable, such that friction resistance and white rust resistance were excellent, and spot-weldability was also excellent. On the contrary, in Comparative Example 1, a surface concentration rate of Mg was low, such that friction resistance, white rust resistance, and spot weldability were all poor.

Figure 1B:
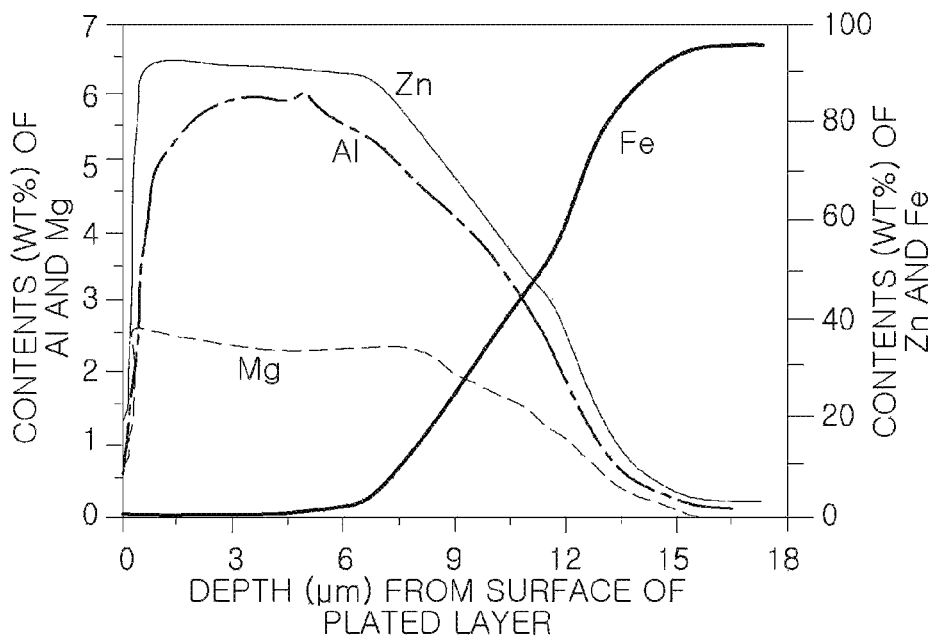

Meanwhile, FIGS. 1A and 1B are results obtained by measuring changes in contents of Al, Mg, Zn, and Fe depending on a depth of a plated layer of a plated steel material using glow discharge emission spectrometry (GDS), wherein FIG. 1A is a GDS measurement result in Inventive Example 1, and FIG. 1B is a GDS measurement result in Comparative Example 1.

FIGS. 2A and 2B are photographs of surfaces of plated steel materials after evaluating white rust resistance, wherein FIG. 2A is a photograph of the surface in Inventive Example 1, and FIG. 2B is a photograph of the surface in Comparative Example 1.

The invention claimed is:

1. A plated steel material comprising:
   a base steel; and
   a plated layer formed on a surface of the base steel, the plated layer containing, by wt %: 0.5 to 14% of Al, 0.5 to 5% of Mg, and a balance of Zn and inevitable impurities,
   wherein the plated layer satisfies the following Equation 1:

$$0.3 \leq ([Mg]_S - [Mg]_{1/2})/[Mg]_{1/2} \leq 0.61,$$ [Equation 1]

where $[Mg]_S$ is a content (wt %) of Mg in a surface of the plated layer, $[Mg]_{1/2}$ is a content (wt %) of Mg at a (½)t position from the surface of the plated layer, and t is a thickness of the plated layer.

2. The plated steel material of claim 1, wherein the plated layer has a microstructure containing a Zn single phase structure and a Zn—Al—Mg based intermetallic compound.

3. The plated steel material of claim 2, wherein the Zn—Al—Mg based intermetallic compound is one or more selected from the group consisting of a Zn/Al/$MgZn_2$ ternary eutectic structure, a Zn/$MgZn_2$ binary eutectic structure, a Zn—Al binary eutectic structure, and an $MgZn_2$ single phase structure.

4. The plated steel material of claim 2, wherein the Zn single phase structure contains Mg in a content of 0.03 wt % or less.

5. The plated steel material of claim 1, wherein the plated layer contains, by wt %, 1 to 11% of Al, 1 to 3% of Mg, and a balance of Zn and inevitable impurities.

6. The plated steel material of claim 1, further comprising: a surface friction coefficient of 0.15 or less.

7. A plated steel material comprising:
   a base steel; and
   a plated layer formed on a surface of the base steel, the plated layer containing, by wt %: 0.5 to 14% of Al, 0.5 to 5% of Mg, and a balance of Zn and inevitable impurities,
   wherein a ratio ($C_1/C_0$) is in a range of 1.02 to 1.16, where $C_0$ is an average content (wt %) of Mg in the plated layer, $C_1$ is a content (wt %) of Mg at a $(\frac{1}{7})$t position from a surface of the plated layer, and t represents a thickness of the plated layer.

8. The plated steel material of claim 7, wherein the plated layer has a microstructure contains a Zn single phase structure and a Zn—Al—Mg based intermetallic compound.

9. The plated steel material of claim 8, wherein the Zn—Al—Mg based intermetallic compound is one or more selected from the group consisting of a $Zn/Al/MgZn_2$ ternary eutectic structure, a $Zn/MgZn_2$ binary eutectic structure, a Zn—Al binary eutectic structure, and an $MgZn_2$ single phase structure.

10. The plated steel material of claim 8, wherein the Zn single phase structure contains Mg in a content of 0.03 wt % or less.

11. The plated steel material of claim 7, wherein the plated layer contains, by wt %, 1 to 11% of Al, 1 to 3% of Mg, and a balance of Zn and inevitable impurities.

12. The plated steel material of claim 7, further comprising: a surface friction coefficient of 0.15 or less.

\* \* \* \* \*